United States Patent Office 2,784,054
Patented Mar. 5, 1957

2,784,054

SEPARATION OF URANIUM FROM OTHER METALS BY HYDRIDING AND EXTRACTION WITH OXIDIZING REAGENTS

James H. Carter, Harrisonburg, Va., and Thomas A. Butler, Ames, Iowa, assignors to the United States of America as represented by the United States Atomic Energy Commission No Drawing. Application December 5, 1944, Serial No. 566,768

3 Claims. (Cl. 23—14.5)

This invention is concerned with the separation of uranium from metallic compositions containing the same. It is frequently found that in the processing of uranium, certain uranium compositions are produced containing other metals such as tin, copper, bismuth, silver, gold, misch metal or other rare earth metals. The problem of separating these metals from the uranium in order to secure uranium of relatively high purity is frequently quite difficult particularly where the uranium is the preponderant component of the metallic composition. In accordance with the present invention it has been found that an effective separation of uranium from metal compositions containing the same may be secured by taking advantage of the high reactivity of uranium for hydrogen. Thus it has been found that a suitable separation may be effected by subjecting the metal composition to the action of hydrogen at a temperature adapted to produce uranium hydride. In such a case the other metals in the composition normally remain unhydrided or substantially unhydrided either due to the fact that these metals do not form hydrides readily or are not hydrogenated at the temperature at which formation of uranium hydride takes place.

For example, it is not uncommon to mix uranium metal with other metals such as tin, copper, silver, gold, etc. in the molten state in certain processing operations. In such a case one or more metal phases normally separate out upon solidification of the mass in the form of a regulus comprising separate layers, dendrites or the like. Separation of these dendrites or other phases from the normally uranium-rich phase with which they are associated may be conveniently secured simply by hydrogenating the mass as herein contemplated.

The essentially selective reaction for production of hydride may be effected by controlling the temperature at a suitably low level for example 200 to 250° C. or up to 300° C. and at a sufficient pressure of the hydrogen atmosphere to react rapidly with the uranium without substantial effect upon other metals which do not react or which react very slowly at the temperatures of operation. A suitable process of hydrogenating uranium is described in copending application for United States Letters Patent of Amos S. Newton, Serial No. 546,178 filed July 22, 1944, which became U. S. Patent No. 2,446,780 on August 10, 1948, and is entitled Method of Preparing Uranium Hydride. As described in the aforesaid application the uranium and physical mixtures of uranium with other metals are reacted at a hydrogen pressure above the decomposition pressure of uranium hydride and not above 150 millimeters of mercury above said decomposition pressure. The hydrogenated material thus formed should be cooled in an atmosphere of hydrogen to prevent dissociation thereof and then if not processed at once is preferably kept in an inert atmosphere of nitrogen or carbon dioxide due to its pyrophoric nature. Uranium hydride is much lighter and bulkier than uranium, where it has been formed from uranium metal which is substantially free from oxide parting planes and it does not adhere to the uranium surface when it is formed but falls to the bottom of the reactor during formation. As a result, the hydrogen will react rapidly and substantially completely with massive uranium free or substantially free from internal oxide parting planes. Thus it has been discovered that massive uranium, prepared by sintering or otherwise bonding uranium powder together, containing internal oxide parting planes, reacts to form only a coating of the hydride upon the surface which adheres and prevents further reaction until it has been removed. On the other hand when massive uranium free from such oxide planes is treated the hydride crumbles and falls from the uranium continuously exposing new uranium and causing the reaction to proceed until it has completed.

Thus it is usually preferable to utilize the present invention in connection with uranium which is substantially free from oxide parting planes. Uranium suitable for this process may be prepared by heating a mixture of $UF_4$ with metallic magnesium or calcium to reaction temperature, permitting reaction to occur to form molten uranium and maintaining the uranium in molten state for a time sufficient to permit uranium to separate as a molten pool and the magnesium or calcium fluoride formed and other impurities to separate from the uranium and to collect as a slag layer which may be removed from the metal. This reaction is conducted in a bomb or other reactor in which oxygen or air may be excluded. Uranium so produced is in massive form, has a melting point below 1200° C., a density above 18 and is substantially free from oxide.

During hydrogenation the other metal components of the composition remain substantially unaffected by the hydrogen, and in consequence the uranium hydride may be separated by taking advantage of the difference in chemical and/or physical properties of the components. For example, the treated product usually is in a crumbled form containing finely divided uranium hydride and coarser particles of the unhydrided metal components. These metals may be separated by suitable classification methods such as sieving, flotation, etc. The uranium hydride separated may be decomposed by heating in an atmosphere of hydrogen at 400 to 500° C. and metallic uranium recovered in a relatively pure state.

Alternatively the hydrogen treated product may be reacted with a solvent which selectively converts the uranium hydride or the unhydrided component to a soluble state. The nature of the solvent used will be determined by the nature of the other metal which is present. For example, in dealing with tin-uranium compositions the mixture of uranium hydride and tin may be extracted with 2 to 3 normal HCl solution usually at an elevated temperature, for example, about 90° C. to remove the tin and leave the hydride behind. Where a gold-uranium composition is under treatment, the mixture of uranium hydride and gold may be treated with silver nitrate solution in order to dissolve uranium and leave the gold unaffected.

In similar manner the hydrided uranium may be removed from other metals by selectively converting the uranium to a water soluble chloride, bromide or sulphate or other water soluble salt using reagents of relatively low acidity to prevent attack of the unhydrided component or by using an oxidizing agent such as silver nitrate and converting the uranium to the uranyl state to form a water soluble uranyl compound such as uranyl nitrate. Other solutions such as antimony chloride ($SbCl_3$), silver acetate, mercurous nitrate, etc. may be used to convert the uranium hydride to a water soluble state and permit removal thereof. Numerous other oxidizing agents particularly weak oxidizing agents capable of oxidizing metallic or hydrided uranium to hexavalent or tetravalent uranium including silver perchlorate and silver tartarate may be used in a similar manner.

The invention herein described is particularly effective for the separation of uranium from metals which do not react with hydrogen to any substantial degree. At the same time, however, it is not limited to such a process since because of the high reactivity of uranium and hydrogen, it is generally possible to maintain the temperature of hydrogenation sufficiently low to effect a substantial hydrogenation of the uranium component without material effect upon the other metal constituents in the composition.

While the invention is particularly adapted to the separation of uranium by formation of uranium hydride, it is also possible to conduct a similar separation by formation of uranium nitride. It is frequently found that uranium hydride itself is a somewhat difficult material to handle due to its pyrophoric nature. This difficulty can be overcome however by converting the uranium hydride to uranium nitride. The nitride is a comparatively stable substance that can be handled readily in the air without serious danger of fire or explosion. This conversion can be carried out by treating the uranium hydride with ammonia, $NH_3$, at a relatively low temperature for example 200°–350° C. The uranium hydride is converted by this process to a uranium nitride having a formula corresponding approximately to UN, or at least between UN and $UN_2$ and the nitride so formed may be separated by sieving, flotation or other classification process or by a suitable preferential extraction process.

In accordance with a further modification, the uranium metal can be directly converted to the nitride by treatment with ammonia. This process of direct treatment of uranium with ammonia however may require a considerably longer time to go to completion where the temperature of nitride formation is maintained at a low level.

If desired, uranium metal or uranium hydride can be treated with ammonia at elevated temperatures such as 800° C. to 1000° C. to form a nitride having a composition corresponding approximately to the formula $UN_x$ where X may be a number from one to about 1.8. The X-ray structure of this nitride indicates the resulting nitride to be a solid solution of nitrogen in $U_2N_3$. This high temperature nitride is similar to the low temperature nitride in many of its physical and chemical characteristics.

When the uranium hydride or the uranium metal is converted to nitride, the other metal component is not effected and remains in its metallic state. Accordingly, it can be separated from the nitride by physical means such as sieving or flotation or by chemical means such as acid leaching which dissolves the other metal and leaves the nitride substantially unaffected.

The following examples are illustrative:

*Example 1*

A mixture of metallic tin and metallic uranium formed by melting 5.27 parts by weight of metallic tin with 107 parts by weight of uranium which was itself substantially free from oxide and had a melting point of 1100±25° C. and had a density of 19±0.1 was cooled to room temperature. The solidified tin-uranium composition comprised dendrites of high tin content dispersed in a body of uranium. This mass was placed in a chamber, the chamber evacuated and flushed with hydrogen and the temperature of the chamber raised to 250° C. Hydrogen was introduced at a rate sufficient to form the hydride. Upon conversion of the uranium to the hydride the dendrites were unaffected and remained as coarse particles which were separated by sieving. Similar results may be secured when the uranium is converted to nitride.

*Example 2*

The process of Example 1 was repeated using a uranium bismuth composition containing about 2.6 parts by weight of bismuth per 100 parts by weight of uranium. Approximately 5 parts by weight of a fraction which failed to pass a 270 mesh screen was secured. This fraction contained most of the bismuth.

*Example 3*

100 parts by weight of uranium metal and 4.6 parts by weight of metallic tin was melted, cooled and reacted with hydrogen as described in Example 1. The mass was leached with two normal HCl in a carbon dioxide atmosphere at 30 to 90° C. for one hour. Uranium hydride remained undissolved and contained but a small quantity of the tin. A similar process may be conducted with sulphuric acid and other non-oxidizing acids of concentration up to about 2 to 3 normal in lieu of the hydrochloric acid.

*Example 4*

The process of Example 1 was repeated forming the uranium hydride as therein described. Thereafter gaseous $NH_3$ was led into the chamber, while the temperature was maintained at 250° C. and the hydride converted to nitride. This nitride was separated by the method of Example 1.

*Example 5*

The process of Example 1 was repeated using 14 parts by weight of silver and 86 parts by weight of the uranium, a very sharp line between phases separating the top cap of silver from the uranium metal mass was found. The mixture was hydrogenated as in Example 1. The cap was not affected by the hydrogenation. 98 percent of the silver and 3 percent of the uranium was concentrated in the silver cap.

Although the present invention has been described with reference to the specific details of certain specific embodiments thereof, it is not intended that such details shall be regarded as limitations upon the scope of the invention except insofar as included in the accompanying claims.

We claim:

1. A method of separating uranium values from a composition containing uranium and another metal which is unreactive to hydrogen under the hereinafter recited conditions utilized in converting uranium to uranium hydride which comprises subjecting said composition to a temperature in the range from 200° C. to 300° C. and a pressure of hydrogen above the decomposition pressure of uranium hydride and not greater than 150 millimeters of mercury above said decomposition pressure whereby the uranium is substantially hydrided without substantially hydriding said other metal, then separating the hydrided uranium from the unhydrided other metal by selectively reacting the uranium hydride to form a soluble uranium compound, and then removing the solution containing the soluble uranium compound from the unreacted other metal.

2. A method of separating uranium values from a composition containing uranium and another metal which is unreactive to hydrogen under the hereinafter recited conditions utilized in converting uranium to uranium hydride which comprises subjecting said composition to a temperature in the range from 200° C. to 300° C. and a pressure of hydrogen above the decomposition pressure of uranium hydride and not greater than 150 millimeters of mercury above said decomposition pressure whereby the uranium is substantially hydrided without substantially hydriding said other metal, separating the hydrided uranium from the unhydrided other metal by selectively reacting the uranium hydride with an oxidizing reagent to form a water soluble uranyl compound, and then removing the solution containing the soluble uranyl compound from the unreacted other metal.

3. A method of separating uranium values from a composition containing uranium and another metal which is unreactive to hydrogen under the hereinafter recited conditions utilized in converting uranium to uranium hydride which comprises subjecting said composition to a temperature in the range from 200° C. to 300° C. and a pressure of hydrogen above the decomposition pressure of uranium hydride and not greater than 150 millimeters of mercury above said decomposition pressure whereby the uranium is substantially hydrided without substantially hydriding said other metal, separating the hydrided uranium from the unhydrided other metal by reacting the uranium hydride with silver nitrate to form uranyl nitrate, and then removing the solution containing uranyl nitrate from the unreacted other metal.

References Cited in the file of this patent

UNITED STATES PATENTS

| | | |
|---|---|---|
| 1,343,441 | Farup | June 15, 1920 |
| 1,796,265 | Freudenberg | Mar. 10, 1931 |
| 1,816,830 | Driggs | Aug. 4, 1931 |
| 1,835,024 | Driggs | Dec. 8, 1931 |

OTHER REFERENCES

Mellor: Comprehensive Treatise on Inorganic and Theoretical Chemistry, vol. 13, pages 308 and 309; vol. 3, page 71; vol. 7, page 324.